United States Patent
Sasson et al.

(10) Patent No.: US 9,710,188 B2
(45) Date of Patent: *Jul. 18, 2017

(54) MANAGING BACKUP RELATIONSHIPS IN A DATA STORAGE SYSTEM

(71) Applicant: INTERNATIONAL BUSINESS MACHINES CORPORATION, Armonk, NY (US)

(72) Inventors: Amir Sasson, Haifa (IL); Eli Malul, Haifa (IL); Itzhack Goldberg, Haifa (IL); Shachar Fienblit, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 269 days.

This patent is subject to a terminal disclaimer.

(21) Appl. No.: 14/159,516

(22) Filed: Jan. 21, 2014

(65) Prior Publication Data

US 2014/0136804 A1    May 15, 2014

Related U.S. Application Data

(63) Continuation of application No. 12/552,209, filed on Sep. 1, 2009, now Pat. No. 8,656,124.

(51) Int. Cl.
| | |
|---|---|
| *G06F 12/00* | (2006.01) |
| *G06F 13/00* | (2006.01) |
| *G06F 13/28* | (2006.01) |
| *G06F 3/06* | (2006.01) |
| *G06F 11/20* | (2006.01) |
| *G06F 11/14* | (2006.01) |

(52) U.S. Cl.
CPC .............. *G06F 3/065* (2013.01); *G06F 3/067* (2013.01); *G06F 3/0619* (2013.01); *G06F 11/1451* (2013.01); *G06F 11/2082* (2013.01); *G06F 11/2087* (2013.01)

(58) Field of Classification Search
CPC ........ G06F 3/065; G06F 3/0619; G06F 3/067; G06F 11/1451; G06F 11/2087; G06F 11/2082
USPC ........................................................ 711/162
See application file for complete search history.

(56) References Cited

U.S. PATENT DOCUMENTS

| | | | |
|---|---|---|---|
| 5,857,208 A | 1/1999 | Ofek | |
| 6,981,114 B1 | 12/2005 | Wu et al. | |
| 7,366,859 B2 | 4/2008 | Per et al. | |
| 2003/0172316 A1* | 9/2003 | Tremblay | G06F 11/2082 714/6.23 |

(Continued)

*Primary Examiner* — Charles Rones
*Assistant Examiner* — Sidney Li
(74) *Attorney, Agent, or Firm* — Griffiths & Seaton PLLC

(57) ABSTRACT

A method for re-establishing a backup relationship between first and second volumes associated with one or more storage media in a data storage system is provided. The method comprises storing first information for preserving the backup relationship, in response to or in advance of receiving a request to terminate the backup relationship; recording changes to the first or second volumes that occur subsequent to terminating the backup relationship; and re-establishing the backup relationship between the first and second volumes according to the first information such that the first and second volumes are synchronized by merging the recorded changes with the first or second volumes.

12 Claims, 4 Drawing Sheets

(56) References Cited

U.S. PATENT DOCUMENTS

2007/0124551 A1\* 5/2007 Taninaka .............. G06F 3/0607
 711/161

\* cited by examiner

MANAGING BACKUP RELATIONSHIPS IN A DATA STORAGE SYSTEM

REFERENCE TO RELATED APPLICATIONS

This application is a continuation of U.S. patent application Ser. No. 12/552,209, now U.S. Pat. No. 8,656,124, filed on Sep. 1, 2009, the contents of which are incorporated herein by reference.

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The claimed subject matter relates generally to data storage systems and, more particularly, to re-establishing a backup relationship in a data storage system.

BACKGROUND

Various technologies (e.g., snapshot technology) may be used to backup data in a data storage system. Generally, in order to backup data stored in a primary volume (i.e., a source volume) in the storage system, a storage controller establishes a relationship between the primary volume and a secondary volume (i.e., a target volume) in the storage system such that the primary volume and the secondary volume are synchronized.

In existing storage systems, a user may be provided with the option to terminate the relationship between the primary volume and the secondary volume. Unfortunately, the relationship may only be terminated in its entirety such that the synchronization between the primary volume and the secondary volume is completely lost.

Unfortunately, once the relationship is terminated, re-establishing the relationship requires a complete re-synchronization of the primary volume and the secondary volume as if the volumes had never been synchronized before. Such implementation is inefficient and diminishes the performance of the storage system.

Systems and methods are needed to overcome the above-mentioned shortcomings.

SUMMARY

The present disclosure is directed to systems and corresponding methods that facilitate re-establishing a backup relationship in a data storage system.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a method for re-establishing a backup relationship between first and second volumes associated with one or more storage media in a data storage system is provided. The method comprises storing first information for preserving the backup relationship, in response to or in advance of receiving a request to terminate the backup relationship; recording changes to the first or second volumes that occur subsequent to terminating the backup relationship; and re-establishing the backup relationship between the first and second volumes according to the first information such that the first and second volumes are synchronized by merging the recorded changes with the first or second volumes.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

Features, elements, and aspects of the claimed subject matter that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the claimed subject matter. The level of detail associated with each of the elements or features should not be construed to qualify the novelty or importance of one feature over the others.

Figure 1:
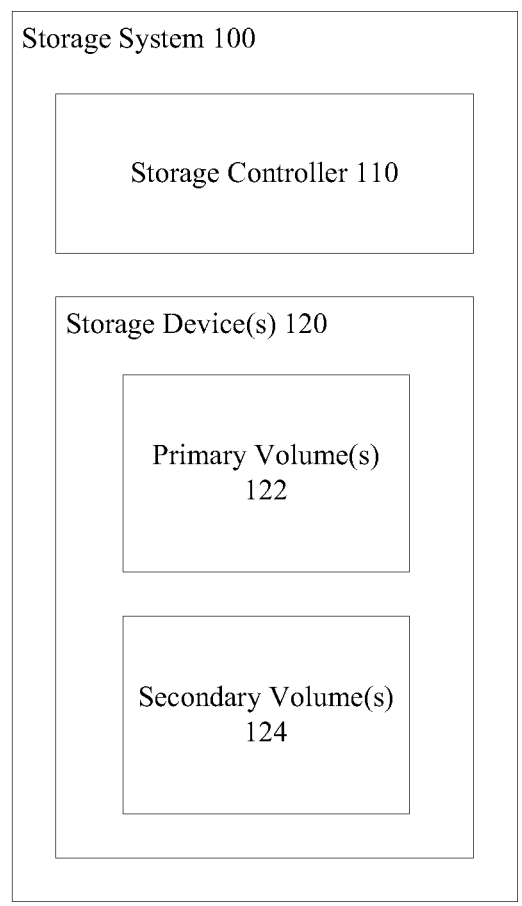
FIG. 1 illustrates an exemplary data storage system, in accordance with one or more embodiments.

Referring to FIG. 1, in accordance with one embodiment, an exemplary storage system 100 comprises a storage controller 110 and one or more storage devices 120. The storages devices 120 comprise one or more primary volumes 122 and one or more secondary volumes 124.

The storage controller 110 may establish an association or relationship between a primary volume 122 and a secondary volume 124 such that the primary volume 122 and the secondary volume 124 are synchronized (e.g., during a backup process). Synchronization between the primary volume 122 and the secondary volume 124 allows data stored on the primary volume 122 to be restored using data stored on the secondary volume 124 or vice versa.

Once the relationship is established, a user may terminate the relationship if services enabled or associated with the relationship (i.e., backup services) are no longer needed or desired. In some scenarios, the user may desire to re-establish a terminated relationship, for example, if the user terminated the relationship by mistake. Or, the user may desire to re-establish the relationship, for example, if the user temporarily terminated the relationship to recover resources allocated to backup services.

In one or more embodiments, the storage controller 110 may provide the user with the option to reversibly terminate (i.e., pseudo-terminate) a relationship between a primary volume 122 and a secondary volume 124 such that re-establishing the relationship does not require a complete re-synchronization between the primary volume 122 and the secondary volume 124 as if the volumes had never been synchronized before. Hereafter, for the purpose of clarity, the term pseudo-terminate is used to distinguish a permanent termination of a relationship between two storage volumes from a reversible termination.

Figure 2:
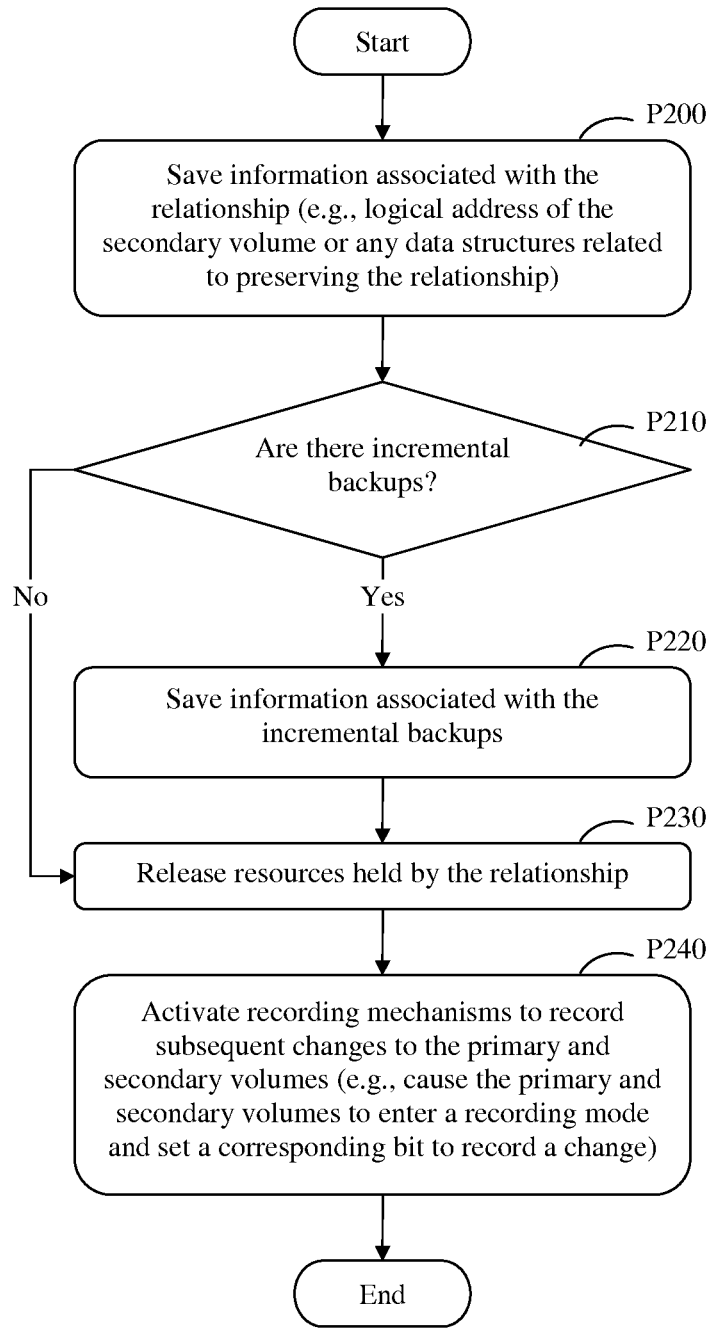
FIG. 2 is a flow diagram of a method for terminating a relationship between a primary volume and a secondary volume, in accordance with one embodiment.

In further detail and referring to FIGS. 1 and 2, in accordance with one embodiment, the storage controller 110 may pseudo-terminate an association or relationship between a primary volume 122 and a secondary volume 124. The storage controller 110 saves information associated with the relationship that would allow future re-establishment of the relationship (P200). For example, the storage controller 110 may save the logical address of the secondary volume 124 or any data structures otherwise related to preserving the relationship between the primary volume 122 and secondary volume 124.

Depending on configuration of the relationship, the relationship may involve incremental synchronization between the primary volume 122 and the secondary volume 124. In incremental synchronization, multiple backups are generated for a storage volume: a full backup of the storage volume and one or more incremental backups of changes made to the storage volume since the full backup.

If it is determined that incremental backups exist (P210), the storage controller 110 saves information associated with the incremental backups (P220). For example, the storage controller 110 may save a target bitmap identifying data blocks that were changed on the primary volume 122 prior to the pseudo-termination, but have not yet been synchronized with the secondary volume 124.

Upon saving the information associated with the relationship and any information associated with incremental backups, the storage controller 110 may complete pseudo-termination of the relationship by releasing resources allocated to the services enabled or associated with the relationship (P230). As provided in further detail below, the storage controller 110 also activates one or more recording mechanisms for saving changes made to the primary volume 122 and the secondary volume 124 subsequent to the pseudo-termination of the relationship (P240).

For example, in one implementation, the storage controller 110 may cause the primary volume 122 and the secondary volume 124 to enter a recording mode during which the storage controller 110 monitors write operations directed to the primary volume 122 and the secondary volume 124. If the storage controller 110 receives a write operation directed to the primary volume 122 or the secondary volume 124 subsequent to the pseudo-termination of the relationship, the storage controller 110 may set a corresponding bit in a respective non-volatile bitmap to identify the data block that has been changed.

Figure 3:
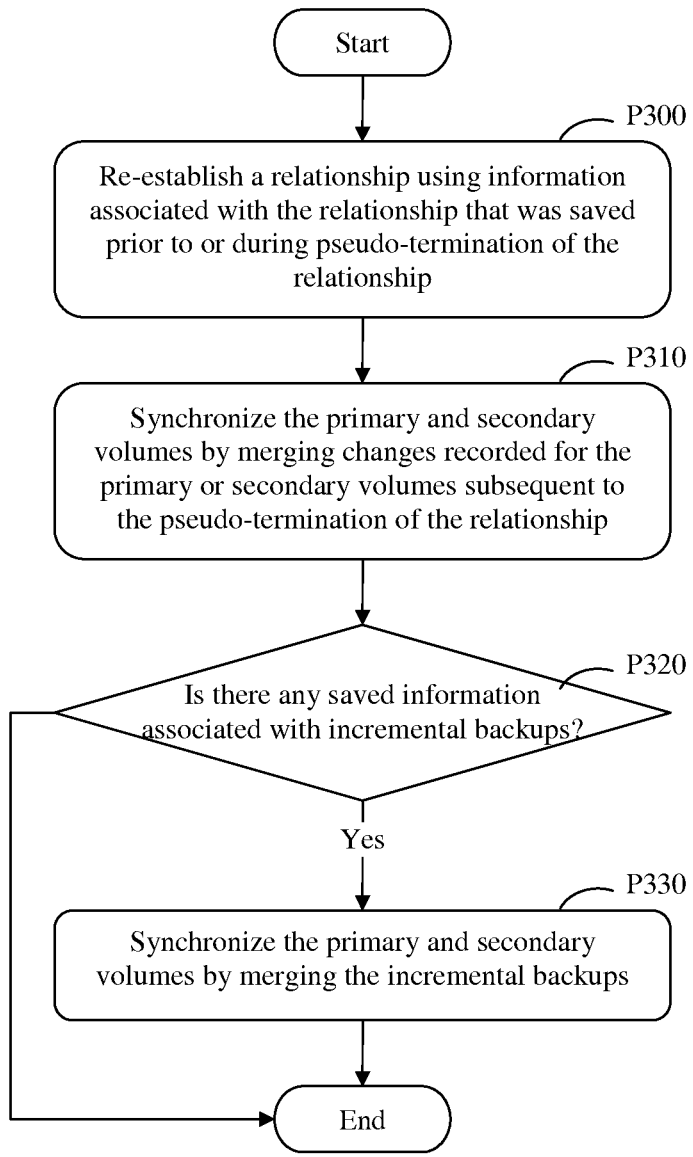
FIG. 3 is a flow diagram of a method for re-establishing a terminated relationship between a primary volume and a secondary volume, in accordance with one embodiment.

Referring to FIGS. 1 and 3, in accordance with one embodiment, the storage controller 110 may re-establish the association or relationship between the primary volume 122 and the secondary volume 124. To re-establish the relationship, the storage controller 110 utilizes information associated with the relationship that was saved prior to or during the pseudo-termination of the relationship, as provided above (P300).

Once the relationship is re-established, the storage controller 110 synchronizes the primary volume 122 and the secondary volume 124 by merging changes made to the primary volume 122 and the secondary volume 124 saved by the recording mechanisms provided above subsequent to pseudo-termination of the relationship (P310). For example, the storage controller 110 may merge the bits in a saved non-volatile bitmap identifying changed data blocks on the primary volume 122 with the bits in a saved non-volatile bitmap identifying changed data blocks on the secondary volume 124. The storage controller may then synchronize the data blocks that are identified by the merged bits on the primary volume 122 and the secondary volume 124.

If information associated with incremental backups was saved prior to or during the pseudo-termination (P320), the storage controller 110 also merges the incremental backups (P330). For example, the storage controller 110 may synchronize data blocks on the primary volume 122 that were changed prior to the pseudo-termination with corresponding data blocks on the secondary volume 124. The changed data blocks may be identified using a saved target bitmap, as provided above.

Advantageously, there is no need to completely re-synchronize the primary volume 122 and the secondary volume 124 in order to re-establish the relationship between the primary volume 122 and the secondary volume 124. Since each change made to the primary volume 122 and the secondary volume 124 after the last synchronization is saved, the relationship between the primary volume 122 and the secondary volume 124 may be re-established by synchronizing the saved changes such that synchronization of the entire primary volume 122 and the secondary volume 124 is not required.

In different embodiments, the claimed subject matter may be implemented either entirely in the form of hardware or entirely in the form of software, or a combination of both hardware and software elements. For example, storage system 100 may be included in a controlled computing system environment that may be presented largely in terms of hardware components and software code executed to perform processes that achieve the results contemplated by the system of the present invention.

Figure 4:
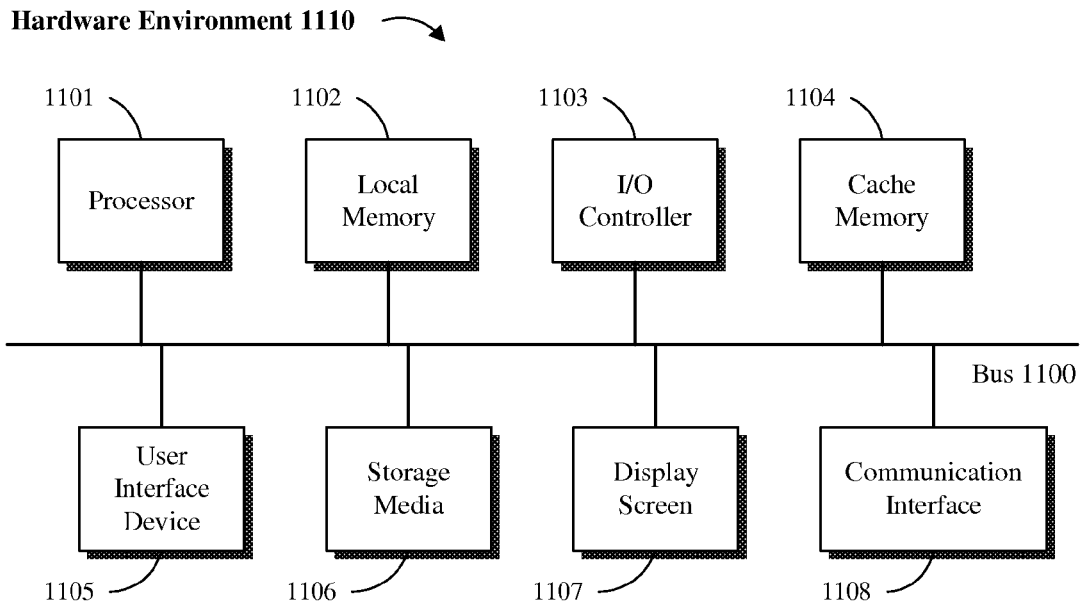
FIGS. 4 and 5 are block diagrams of hardware and software environments in which a system of the present invention may operate, in accordance with one or more embodiments.
Figure 5:
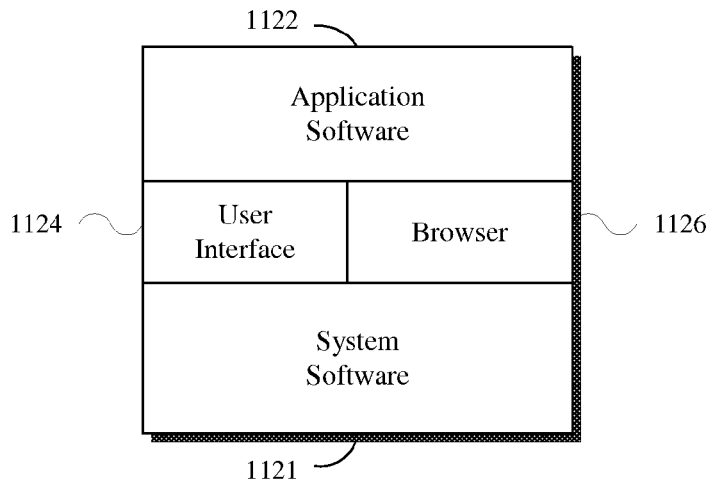

Referring to FIGS. 1, 4, and 5, a computing system environment in accordance with an exemplary embodiment is composed of a hardware environment 1110 and a software environment 1120. The hardware environment 1110 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. System software 1121 comprises control programs, such as the operating system (OS) and information management systems that instruct the hardware how to function and process information.

In one embodiment, the storage controller 110 is implemented as application software 1122 executed on one or more hardware environments to re-establish a backup relationship in a data storage system. Application software 1122 may comprise but is not limited to program code, data structures, firmware, resident software, microcode or any other form of information or routine that may be read, analyzed or executed by a microcontroller.

In an alternative embodiment, the claimed subject matter may be implemented as computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 4, an embodiment of the application software 1122 may be implemented as computer software in the form of computer readable code executed on a data processing system such as hardware environment 1110 that comprises a processor 1101 coupled to one or more memory elements by way of a system bus 1100. The memory elements, for example, may comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 5, application software 1122 may comprise one or more computer programs that are executed on top of system software 1121 after being loaded from storage media 1106 into local memory 1102. In a client-server architecture, application software 1122 may comprise client software and server software. For example, in one embodiment, client software is executed on a general computer (not shown) and server software is executed on a server system (not shown).

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps can be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter as defined by the claims and their full scope of equivalents.

The invention claimed is:

1. A method for re-establishing a backup relationship between a first volume and a second volume in a data storage system, the method comprising:

establishing the backup relationship between the first volume and the second volume;

receiving a request to reversibly terminate the backup relationship;

in response to receiving the request to reversibly terminate the backup relationship, storing first information for preserving the backup relationship and reversibly terminating the backup relationship;

recording each change to the first volume and to the second volume that occurs subsequent to the backup relationship being reversibly terminated;

receiving a request to re-establish the backup relationship between the first volume and the second volume;

re-establishing the backup relationship between the first volume and the second volume utilizing the stored first information;

releasing resources associated with the backup relationship subsequent to the backup relationship being reversibly terminated;

storing second information associated with incremental backups of the first volume and the second volume; and synchronizing the first and second volumes by merging the incremental backups with the first or second volumes and merging the recorded changes with the first or second volumes.

2. The method of claim 1, wherein the first information comprises at least one of a logical address of the second volume or a data structure related to preserving the backup relationship.

3. The method of claim 1, further comprising entering an operating mode that enables the recording, in response to receiving the request to reversibly terminate the backup relationship.

4. The method of claim 1, wherein the recording comprises:

monitoring write operations directed to data blocks in the first volume and the second volume; and setting corresponding bits in a first non-volatile bitmap and a second non-volatile bitmap to identify changed data blocks in the first volume and the second volume, respectively.

5. A system for re-establishing a backup relationships in a data storage system, the system comprising:

a storage device comprising a first volume and a second volume; and a processor coupled to the storage device, wherein the processor is configured for:

establishing the backup relationship between the first volume and the second volume, receiving a request to reversibly terminate the backup relationship, in response to receiving the request to reversibly terminate the backup relationship, storing first information for preserving the backup relationship and reversibly terminating the backup relationship, recording each change to the first volume and to the second volume that occurs subsequent to the backup relationship being reversibly terminated, receiving a request to re-establish the backup relationship between the first volume and the second volume, re-establishing the backup relationship between the first volume and the second volume utilizing the stored first information, releasing resources associated with the backup relationship subsequent to the backup relationship being reversibly terminated, stores second information associated with incremental backups of the first volume and the second volume, and synchronizes the first and second volumes by merging the incremental backups with the first or second volumes and merging the recorded changes with the first or second volumes.

6. The system of claim 5, wherein the first information comprises at least one of a logical address of the second volume or a data structure related to preserving the backup relationship.

7. The system of claim 5, wherein the processor is further configured for entering an operating mode that enables the recording, in response to receiving the request to reversibly terminate the backup relationship.

8. The system of claim 5, wherein, when recording each change, the processor is configured for:

monitoring write operations directed to data blocks in the first volume and the second volume; and setting corresponding bits in a first non-volatile bitmap and a second non-volatile bitmap to identify changed data blocks in the first volume and the second volume, respectively.

9. A computer program product comprising a non-transitory computer readable medium concluding logic code stored thereon, wherein the logic code, when executed on a computing device, causes the computing device to perform a method comprising:

establishing the backup relationship between the first volume and the second volume;

receiving a request to reversibly terminate the backup relationship;

in response to receiving the request to reversibly terminate the backup relationship, storing first information for preserving the backup relationship and reversibly terminating the backup relationship;

recording each change to the first volume and to the second volume that occurs subsequent to the backup relationship being reversibly terminated;

receiving a request to re-establish the backup relationship between the first volume and the second volume;

re-establishing the backup relationship between the first volume and the second volume utilizing the stored first information;

releasing resources associated with the backup relationship subsequent to the backup relationship being reversibly terminated;

storing second information associated with incremental backups of the first volume and the second volume; and synchronizing the first and second volumes by merging the incremental backups with the first or second volumes and recorded changes with the first or second volumes.

10. The computer program product of claim 9, wherein the logic code storing first information comprises at least one of a logical address of the second volume or a data structure related to preserving the backup relationship.

11. The computer program product of claim 9, wherein the logic code, when executed on the computing device, causes the computing device to further perform entering an operating mode that enables the recording, in response to receiving the request to reversibly terminate the backup relationship.

12. The computer program product of claim 9, wherein the logic code, when recording, performs:

monitoring write operations directed to data blocks in the first volume and the second volume; and setting corresponding bits in a first non-volatile bitmap and a second non-volatile bitmap to identify changed data blocks in the first volume and the second volume, respectively.

* * * * *